July 8, 1947.   B. E. LUBOSHEZ   2,423,715
APPARATUS FOR ABRADING SURFACES
Filed Dec. 13, 1945   2 Sheets-Sheet 1
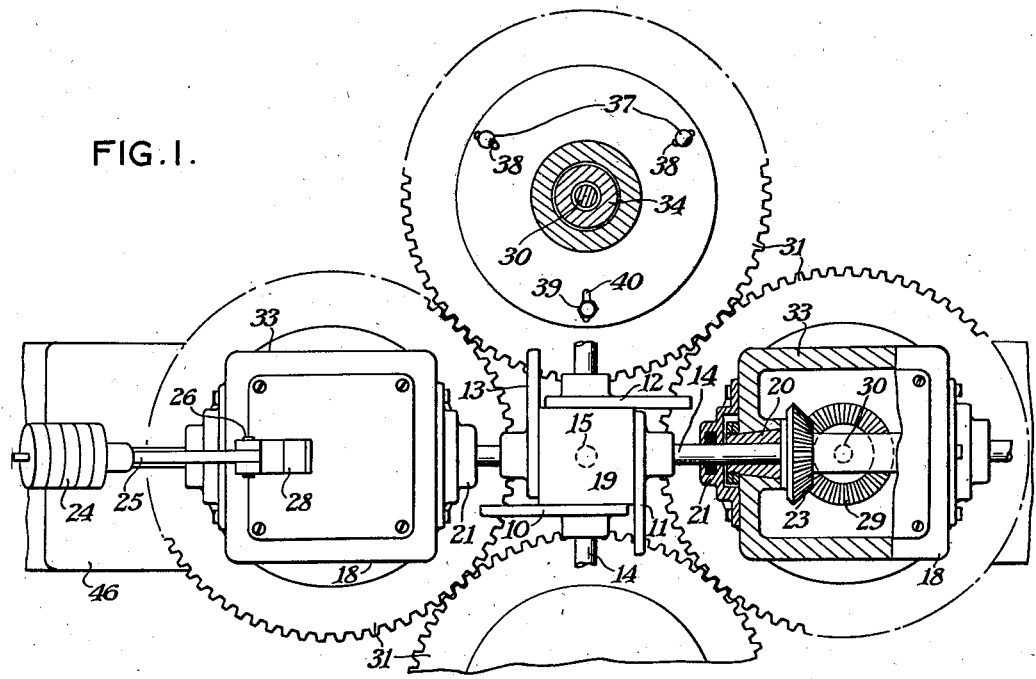
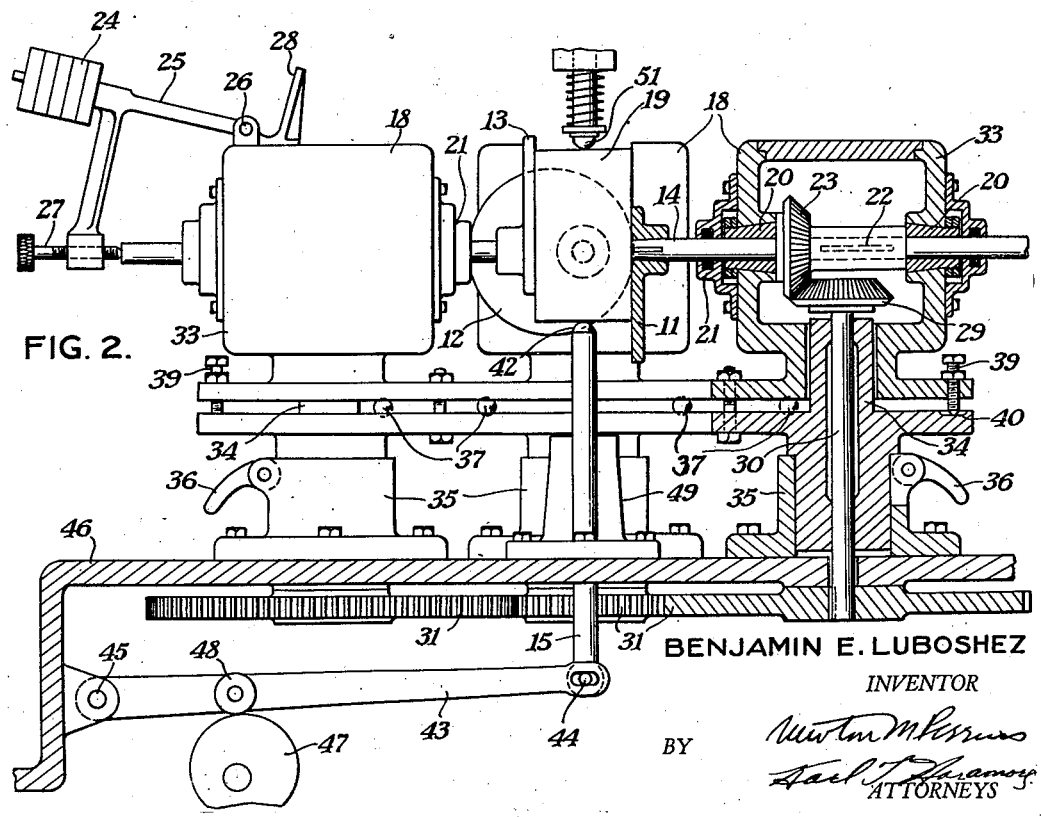
BENJAMIN E. LUBOSHEZ
INVENTOR July 8, 1947.　　　　B. E. LUBOSHEZ　　　　2,423,715
APPARATUS FOR ABRADING SURFACES
Filed Dec. 13, 1945　　　　2 Sheets-Sheet 2

BENJAMIN E. LUBOSHEZ
*INVENTOR*

BY
ATTORNEYS

Patented July 8, 1947

2,423,715

UNITED STATES PATENT OFFICE 2,423,715

APPARATUS FOR ABRADING SURFACES

Benjamin E. Luboshez, Rochester, N. Y., assignor to Eastman Kodak Company, Rochester, N. Y., a corporation of New Jersey Application December 13, 1945, Serial No. 634,663

4 Claims. (Cl. 51—111)

The present invention relates to an apparatus for abrading surfaces and particularly to an apparatus for multiply grinding several surfaces of an optical element simultaneously.

In the working of optical glass, it is universal practice to work each surface separately, the block of glass being held so that one surface at a time is exposed and the position is changed according to the surface being worked. In grinding the polishing prisms, for instance, considerable time is thus consumed in adjusting the angles between the various faces so as to give the required angular relation between the planes.

One object of the present invention is to provide a method and apparatus whereby the normal procedure of grinding the surfaces of an optical element are simplified and the rate of production is increased.

Another object is to block prisms on a rectangular block with the two adjacent surfaces to be abraded exposed on adjacent faces of the block and to abrade such surfaces simultaneously.

A further object is to provide an abrading machine, including four plano tools arranged in a square so that a rectangular block of work can be supported between them and have four sides thereof abraded simultaneously.

And yet another object is to provide an abrading apparatus of the type set forth in which the block of work is periodically moved transversely of the tool faces during the abrading operation to break up the path of wear between the tool and work surfaces and thereby obtain uniform wear over the entire surfaces of the work.

And another object is to provide an apparatus of the type set forth in which the several tools are geared together to operate in synchronism, are individually mounted for accurate relative angular adjustment, and can be individually removed from an operative position to permit an interchanging of the tools, a dressing of the tools, etc.

Figure 3:
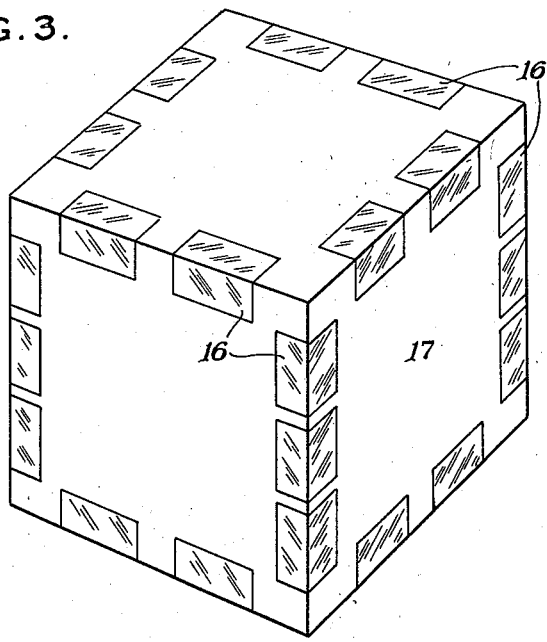
Figure 4:
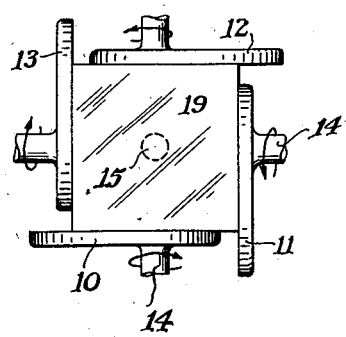

The novel features that I consider characteristic of my invention are set forth with particularity in the appended claims. The invention itself, however, both as to its organization and its methods of operation, together with additional objects and advantages thereof, will best be understood from the following description of a specific embodiment when read in connection with the accompanying drawings in which, Fig. 1 is a top plan view, partly in section, of an abrading machine constructed in accordance with a preferred embodiment of the present invention, Fig. 2 is a front view, partly in section, of the machine shown in Fig. 1, but with one grinding head removed for purposes of clarity, and with the tools 11 and 13 rotated 90° from the position shown in Fig. 1, Fig. 3 is a perspective view showing one manner of blocking a plurality of right angle prisms preparatory to having the pair of perpendicular sides thereof simultaneously abraded by the use of the present apparatus, and Fig. 4 is a diagrammatic view illustrating the principle upon which the apparatus is based.

Like reference characters refer to corresponding parts throughout the drawings.

Briefly, according to the present invention, it is proposed to grind several of the surfaces involved simultaneously so that right angles between adjacent planes might be formed in one operation.

Since right angle prisms (including roof prisms) form by far the greatest proportion of all prisms manufactured, only such prisms will be considered in detail in this specification, although it is pointed out that the apparatus to be described may be adapted for other types.

Referring now to the drawings, Fig. 4 illustrates diagrammatically the principle upon which the machine is based. Four plano abrading tools 10, 11, 12, and 13 are arranged so that each rotates with its plano surface in say, a vertical plane, the four planes being arranged so that adjacent pairs are mutually at right angles. The planes of the opposite pairs are thus parallel, and it is this fact which, to a great extent, makes it possible to obtain a high degree of precision. Opposite tools, after adjustment for parallelism, may be ground together in situs for the purpose of dressing the faces of the tools. The tools are mounted eccentrically on spindles 14 and adjacent pairs are arranged to rotate in opposite directions so that with all four spindles 14 geared together, there is no interference between adjacent tools. Within limits, for a given size of tool, the separation between opposite tools can be adjusted, as will be described below.

When it is desired to grind a cube of glass or a rectangular prism, it is placed between the grinding tools so as to rest upon a rod 15, and the tools, being pressed against the sides of the prism, are rotated at the required speed and fed with abrasives and lubricants. The tools sweep over each of the four faces of the work simultaneously while the rod 15 is moved up and down with an adjustable speed and stroke. The mechanism operating the movement of rod 15 and the rotations of the tools are so arranged that the same relative positions between the work and tools are only reproduced after a great number of movements. From time to time the block of work may be removed and turned through a right angle so that all the sides are acted upon by different grinders; and further, from time to time, the block of work may be reversed end for end as in this way all of the surfaces being worked upon may be made to receive equal treatment so that the errors, if any, are averaged out. The manufacture of rectangular prisms with four simultaneously operating tools is thus a simple and speedy operation.

However, the method and apparatus is not designed only for the manufacture of rectangular prisms, but is designed principally for the manufacture of any prism in which there are adjacent surfaces at right angles. This is done by suitably mounting a considerable number of the prisms together in a block, such as shown in Fig. 3. All of the prisms are held together with a suitable cement on a reinforcing foundation, just as intricate clay models are held by sculptors during modeling. The details of this mounting are outside of the present invention, but Fig. 3 shows the form that might be taken by a large number of roof prisms 16 when arranged along the edges of a cube 17. There is no particular difficulty about mounting the prisms in this way. They could, for example, be attached with wax to the inner side of a built-up hollow tube fitted with a removable lid having a hole in it. The prisms would be suitably surrounded with a reinforcing framework, and then the cement would be poured in. When set, the hollow cube could be warmed to melt the wax and the sides removed, leaving the prisms imbedded in the cement with the surfaces to be ground exposed as shown in Fig. 3. Very great accuracy in the setting of the prisms is not required in the first instance because they are only roughly shaped in any case; but the overall dimensions and parallelism of opposite sides, together with the rectangularity of adjacent planes, must be reasonably well assured.

Of course, it is not essential that the prisms be mounted in the form of a cube—they may, for example, be mounted in the form of a bar, in which case no prism would be mounted at the top and bottom surfaces. Once the prisms have been securely mounted as described, the whole block is placed in position between the tool faces and grinding is commenced. From time to time the block is rotated through 90 degrees about a vertical axis, and occasionally it is rotated about a horizontal axis and then about a horizontal axis at right angles to the first. In that way, grinding proceeds evenly and uniformly on all of the surfaces being ground. All of the angles can be checked from time to time with known types of angle comparators. Experience will show how often it will be necessary to remove the block of work and rotate it through a right angle, and it is possible that this may be done only very rarely, if at all; but in any case, the operation need last not more than a few seconds.

Up to this point, only the method of simultaneously grinding a plurality of surfaces on one or more pieces of work, along with the principle of operation of an apparatus for carrying out such a method, has been set forth. Now a specific embodiment of a practical form that the apparatus might take will be set forth.

Referring to Figs. 1 and 2, the complete machine comprises four separate grinding heads 18, one for supporting and driving each of the tools 10, 11, 12, and 13. In these figures, the grinding head for tool 10 is omitted for purposes of clarity, but since each of the heads is the same, both in construction and operation, the omission of this one head is not important; and in describing the structure only one of the heads will be specifically described and numbered, it being understood that the parts of each head are identical in operation and construction, and bear the same reference characters. As shown, each of the tools press against one of the four sides of the block of work 19 while the rod 15 presses against the bottom of the block to prevent it from falling from between the tools. Looking at the right-hand grinding head 18 of Figs. 1 and 2, which is shown in section, the tool spindle 14 is carried in adjustable bearings 20 of the split-cone type with stuffing boxes 21 which prevent abrasives from entering the bearings. This spindle carries a keyway 22 in which slides a key attached to beveled gear 23 so that the spindle is rotated by the gear while the spindle can be moved longitudinally as desired.

During operation, the position of the spindle 14 in one of each pair of grinding heads after adjustment for the size of the block of work being done, remains fixed by suitable means not shown. Pressure on the work is then maintained by pushing upon the spindle 14 of the opposing grinding head holding the tool 13, for instance. This pressure is achieved conveniently by means of an adjustable weight 24 and framework 25, which is pivoted to the head at 26. By means of an adjustable screw 27, axial pressure is maintained on the spindle 14 supporting tool 13. To relieve the pressure, the framework 25 is pushed upward to rest against stop 28. This is done every time it is required to remove the block 19; and upon reinserting this block, the pressure can be instantly reapplied by again dropping the framework 25.

Rotation of the spindle 14 takes place through the bevel gears 23 and 29, the vertical shaft 30 and the intermeshing spur gears 31 beneath the head. These spur gears (one for each head) are rotated by an electric motor, not shown, so that the four tools rotate in phase with each other, or in synchronism so that they don't interfere because of their eccentricity on the spindles. This axial arrangement for transmitting the power to the individual tools permits the whole of each head assembly, including gear housing 33 and sleeve 34, to be rotated about a vertical axis with a standard 35 serving as a bearing. Normally, the head assembly is locked in position by means of a handle 36. The advantages of being able to swing the tools out of position are several: (1) maintenance and interchange of the tools is thereby facilitated, (2) the use of the apparatus for grinding flat parallel plates is made possible by swinging opposite tools aside and using only one pair, (3) opposing tools can be brought into and run in surface contact for the purpose of truing their surfaces, and (4) the operation of setting opposite spindles parallel to each other is simplified.

In order to adjust each tool so that its axis of rotation may be in a horizontal plane, further adjustments are provided. These adjustments need cover only very small angles, say one degree or less, and are provided by supporting the gear housing 33 of each head 18 upon two hardened steel balls 37 which rest in radial grooves 38 on the upper surface of sleeve 34, see Fig. 1, and are constrained from above by conical holes in the bottom surfaces of the gear housing 33. The third point of support is obtained by an adjustable screw 39 which also rests in the radial V-groove 40 in the upper surface of sleeve 34. Thus by adjusting screw 39, the tilt of the spindle axis of each head can be controlled.

Adjustment of the apparatus so that opposite tool faces may be in strictly parallel plane, and so that the angles between adjacent tools shall be strictly at right angles, can be carried out with reasonable ease through the use of optical methods. For instance, one of the spindles 14 can be made hollow so that an auto-collimator can be inserted thereinto. This, with a parallel plate of glass attached to the working face of the tool on that spindle and a little suction cup mirror attached to the face of the opposing tool, would enable parallelism to be obtained. The angle between adjacent tool surfaces could likewise be checked and adjusted with the help of an auto-collimator and little suction cup mirrors which could be fastened to the tool faces.

The movement of the block of work 19 up and down or transversely of the tool faces is obtained by the rod 15 fitted with a soft tip 42 and reciprocated by means of an arm 43 having a pin-and-slot connection 44 with the lower end of the rod and pivoted at the other end at 45 to the base 46 of the apparatus. This arm carries a follower 48 which engages a cam 47 which may be rotated by any suitable means, not shown, such as a gearing from one of the spur gears 31. The rod moves up and down through a bearing 49 fitted with a stuffing box, not shown, to exclude abrasives. In certain cases, it may be necessary to hold the block of work down upon the rod and in that case a second rod, not shown, working in unison with the first might be adjusted to press down upon the top of the block 19, or a spring-pressed plunger 51 carried by the frame of the machine may be used as shown in Fig. 2. While no specific arrangement is shown for applying abrasive and lubricant to the work and tool faces during operation of the machine, it will be readily understood by those skilled in the art that provision for the addition of abrasive and lubricant must be provided and that it can be readily provided for in any one of a number of well-known manners.

Although I have shown and described certain specific embodiments of my invention, I am fully aware that many modifications thereof are possible. My invention, therefore, is not to be limited to the precise details of construction shown and described, but is intended to cover all modifications coming within the scope of the appended claims.

Having thus described my invention, what I claim as new and desire to secure by Letters Patent of the United States is:

1. An abrading machine of the type described comprising in combination four plano abrading tools arranged so that their axes lie substantially in the same plane and the plano faces of opposing tools are parallel to one another while the faces of adjacent tools are mutually at right angles, whereby said tools are adapted to simultaneously engage four sides of a rectangular block of work disposed between them, each of said tools being eccentrically mounted on the end of a spindle, whereby a portion of each tool is adapted to overhang the edges of said block as it rotates and intersect the grinding plane of each adjacent tool periodically during rotation, means for normally forcing one of each parallel pair of tools toward the other of said pair, and means for synchronously driving said individual tools so that they do not interfere with one another.

2. An abrading machine of the type described comprising in combination four abrading heads radially disposed about a common center, each of said heads including a horizontal spindle extending toward said common center, a plano abrading tool mounted eccentrically on the end of each of said spindles, whereby said four tools are adapted to simultaneously engage four sides of a rectangular block of work disposed between them and a portion of each tool is adapted to overhang the edges of said block as it rotates and intersect the grinding plane of each adjacent tool periodically during rotation, a gear train for driving each of said spindles and including a spur gear, each of said spur gears being geared together for operating said spindles in synchronism so that the tools do not interfere with one another, and means for periodically shifting said block of work transversely of said tool faces during the abrading operation.

3. An abrading machine of the type described comprising in combination four abrading heads radially disposed about a common center, each of said heads including a vertical shaft having a bevel gear fixed to the upper end thereof, a sleeve rotatably engaging said vertical shaft, a gear housing enclosing said bevel gear and including a portion engaging said sleeve; a horizontal shaft journalled in said gear housing and extending toward said common center, a bevel gear connected to said shaft and engaging said first-mentioned bevel gear; a plano abrading tool mounted eccentrically on the end of said horizontal spindle, whereby the four tools are adapted to simultaneously engage four sides of a rectangular block of work disposed between them and a portion of each is adapted to overhang the edges of said block as it rotates and intersect the grinding plane of each adjacent tool periodically during rotation, a spur gear on the lower end of each of said vertical shafts and the four of them geared together for rotating said spindles in synchronism so that the tools do not interfere with one another; a stationary supporting column rotatably engaged by said sleeve to permit the gear housing, horizontal spindle and sleeve to be rotated through 90 degrees about said vertical axis to move the tool associated therewith from operative relation with respect to the other tools, and means for releasably clamping said sleeve and column against relative movement.

4. An abrading machine of the type described comprising in combination four abrading heads radially disposed about a common center, each of said heads including a vertical shaft having a bevel gear fixed to the upper end thereof, a sleeve rotatably engaging said vertical shaft, a gear housing enclosing said bevel gear and including a portion engaging said sleeve; a horizontal shaft journalled in said gear housing and extending toward said common center, a bevel gear connected to said shaft and engaging said first-mentioned bevel gear; a plano abrading tool mounted eccentrically on the end of said horizontal spindle, whereby the four tools are adapted to simultaneously engage four sides of a rectangular block of work disposed between them and a portion of each is adapted to overhang the edges of said block as it rotates and intersect the grinding plane of each adjacent tool periodically during rotation, a spur gear on the lower end of each of said vertical shafts and the four of them geared together for rotating said spindles in synchronism so that the tools do not interfere with one another; means for adjusting each abrading head to make the horizontal spindle truly horizontal, said means comprising a three point horizontal suspension between said gear housing and said sleeve, two of said points of suspension constituting a steel ball engaging a detent in one of the parts and an elongated radial groove in the other part and the third point of suspension comprising an adjustable screw carried by one of the parts and including a conical end engaging a radial groove in the other part.

BENJAMIN E. LUBOSHEZ.

REFERENCES CITED

The following references are of record in the file of this patent:

UNITED STATES PATENTS

| Number | Name | Date |
|---|---|---|
| 417,983 | Bugbee et al. | Dec. 24, 1889 |
| 828,894 | Martin | Aug. 21, 1906 |
| 1,132,192 | Kress | Mar. 16, 1915 |
| 1,638,028 | Gardner | Aug. 9, 1927 |
| 1,101,261 | Timmer | June 23, 1914 |
| 108,775 | Gardner | Nov. 1, 1870 |
| 961,560 | Trautvetter | June 14, 1910 |
| 1,784,231 | Gardner | Dec. 9, 1930 |
| 1,576,820 | Gardner | Mar. 16, 1926 |
| 2,354,970 | Volkel | Aug. 1, 1944 |
| 2,361,514 | Tillyer et al. | Oct. 31, 1944 |